(12) United States Patent
Lu et al.

(10) Patent No.: US 12,212,014 B2
(45) Date of Patent: Jan. 28, 2025

(54) MOUSE DEVICE

(71) Applicant: DEXIN CORPORATION, New Taipei (TW)

(72) Inventors: Ho-Lung Lu, New Taipei (TW); Chin-Lung Lin, New Taipei (TW); Yen-Cheng Wang, Taipei (TW)

(73) Assignee: DEXIN CORPORATION, New Taipei (TW)

( * ) Notice: Subject to any disclaimer, the term of this patent is extended or adjusted under 35 U.S.C. 154(b) by 405 days.

(21) Appl. No.: 17/346,391

(22) Filed: Jun. 14, 2021

(65) Prior Publication Data

US 2022/0149470 A1 May 12, 2022

(30) Foreign Application Priority Data

Nov. 6, 2020 (TW) .................................. 109138786

(51) Int. Cl.
| | |
|---|---|
| *H01M 50/247* | (2021.01) |
| *G06F 3/0354* | (2013.01) |
| *G06F 3/038* | (2013.01) |
| *G06F 3/039* | (2013.01) |
| *H01M 10/42* | (2006.01) |

(Continued)

(52) U.S. Cl.
CPC ...... *H01M 50/247* (2021.01); *G06F 3/03543* (2013.01); *G06F 3/038* (2013.01); *G06F 3/039* (2013.01); *H01M 10/4257* (2013.01); *H01M 10/488* (2013.01); *H01M 50/264* (2021.01); *H01M 50/284* (2021.01);

(Continued)

(58) Field of Classification Search
CPC ............. H01M 50/247; H01M 50/264; H01M 50/284; H01M 10/4257; H01M 10/488; H01M 2010/4278; H01M 2220/30; G06F 3/03543; G06F 3/038; G06F 3/039; G06F 2203/0337

See application file for complete search history.

(56) References Cited

U.S. PATENT DOCUMENTS

| | | | | |
|---|---|---|---|---|
| 6,609,925 | B1 * | 8/2003 | Cannon ................ | H01R 13/625 |
| | | | | 439/578 |
| 7,817,136 | B2 * | 10/2010 | Shaft ................... | G06F 3/03543 |
| | | | | 345/163 |

(Continued)

FOREIGN PATENT DOCUMENTS

| | | | | |
|---|---|---|---|---|
| CN | 102053723 | A | * | 5/2011 |
| TW | 200925943 | A | * | 6/2009 |

*Primary Examiner* — Rockshana D Chowdhury
*Assistant Examiner* — Martin Antonio Asmat Uceda
(74) *Attorney, Agent, or Firm* — Li & Cai Intellectual Property (USA) Office

(57) ABSTRACT

A mouse device is provided. The mouse device includes a battery module, a casing, and a control circuit. The battery module includes a first connection interface. The casing includes a second connection interface. The control circuit is disposed inside the casing and is electrically connected to the second connection interface. The battery module is detachably mated with the second connection interface through the first connection interface, and the battery module is exposed outside of the casing when being mated with the second connection interface. The control circuit obtains a power supply from the battery module through the second connection interface when the battery module is mated with the second connection interface.

10 Claims, 13 Drawing Sheets

(51) Int. Cl.
  *H01M 10/48*    (2006.01)
  *H01M 50/264*   (2021.01)
  *H01M 50/284*   (2021.01)

(52) U.S. Cl.
  CPC .............. *G06F 2203/0337* (2013.01); *H01M 2010/4278* (2013.01); *H01M 2220/30* (2013.01)

(56) References Cited

U.S. PATENT DOCUMENTS

| | | | | |
|---|---|---|---|---|
| 8,081,160 | B2* | 12/2011 | Cheng | G06F 3/03543 345/169 |
| 8,138,717 | B2* | 3/2012 | Chatterjee | G06F 3/0383 439/38 |
| 9,692,144 | B1* | 6/2017 | Hung | H01R 13/512 |
| 11,620,004 | B2* | 4/2023 | Bustamante | H04L 67/125 345/163 |
| 12,105,896 | B2* | 10/2024 | Helmes | G06F 3/03543 |
| 2007/0188456 | A1* | 8/2007 | Shaft | G06F 3/03543 345/163 |
| 2008/0218478 | A1* | 9/2008 | Cheng | G06F 3/03543 345/163 |
| 2010/0194350 | A1* | 8/2010 | Chatterjee | G06F 3/0383 439/39 |
| 2013/0043830 | A1* | 2/2013 | Lin | H02J 7/0042 320/107 |
| 2014/0210719 | A1* | 7/2014 | Chen | G06F 1/266 345/163 |

* cited by examiner

MOUSE DEVICE

CROSS-REFERENCE TO RELATED PATENT APPLICATION

This application claims the benefit of priority to Taiwan Patent Application No. 109138786, filed on Nov. 6, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a computer peripheral device, and more particularly to a mouse device.

BACKGROUND OF THE DISCLOSURE

Conventional mice are generally divided into wired mice and wireless mice. In the case of the wireless mouse, a battery is disposed inside of a mouse casing, such that a space inside the wireless mouse is relatively reduced. In addition, the battery of the conventional wireless mouse is fixedly disposed inside the mouse casing, or the battery is stored in a battery slot which is covered by a battery cover on the outside of the battery slot. However, the way that the battery is arranged in the conventional wireless mouse makes it difficult for a user to quickly replace the battery.

SUMMARY OF THE DISCLOSURE

In response to the above-referenced technical inadequacy, the present disclosure provides a mouse device with a convenient design for a quick replacement of a battery.

In one aspect, the present disclosure provides a mouse device that includes a battery module, a casing, and a control circuit. The battery module includes a first connection interface, and the casing includes a second connection interface. The control circuit is disposed inside the casing and is electrically connected to the second connection interface. The battery module is detachably mated with the second connection interface through the first connection interface, and the battery module is exposed outside of the casing when being mated with the second connection interface. The control circuit obtains power from the battery module through the second connection interface when the battery module is mated with the second connection interface.

In another aspect, the present disclosure provides a mouse device that includes a battery module, a casing, and a control circuit. The battery module includes a first connection interface, and the casing includes a second connection interface and a third connection interface. The control circuit is disposed inside the casing and is electrically connected to the second connection interface and the third connection interface. The battery module is detachably mated with the second connection interface through the first connection interface, and the battery module is exposed outside of the casing when being mated with the second connection interface. The third connection interface is used for connecting a transmission line. The control circuit controls an operation of the mouse device to be in a wired mode or a wireless mode according to a connection status of the second connection interface and the third connection interface.

Therefore, by virtue of the battery module being connected to the outside of the casing, the battery module can be quickly and easily changed when the battery module needs to be replaced. In addition, the battery module does not need to occupy an internal space of the casing, such that the internal space of the mouse device can be more flexibly utilized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1A:
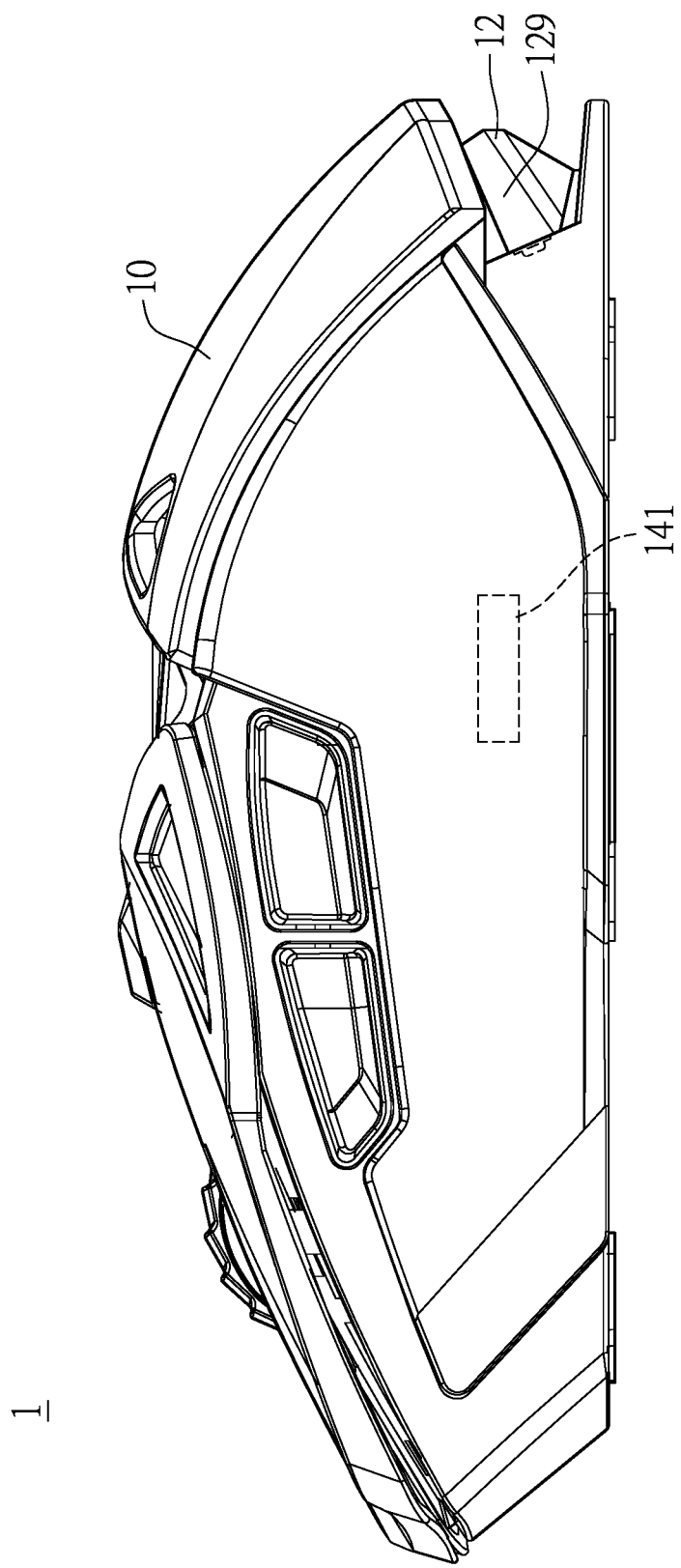
FIG. 1A is a schematic assembled view of a mouse device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a mouse device, and the mouse device is designed to use a power supply in a plug-in manner. Furthermore, power for the mouse device is supplied by a battery module that is pluggable. When the battery module is used for the mouse device, the battery module is mated with an appropriate position on the mouse device, and at least a part of the battery module is exposed on an outside surface of the mouse device. Accordingly, when the battery module needs to be replaced, a user can pull the battery module out directly from the outside surface of the mouse device. Therefore, the mouse device provided by the present disclosure allows the user to quickly and easily replace the battery module.

First Embodiment

Figure 1B:
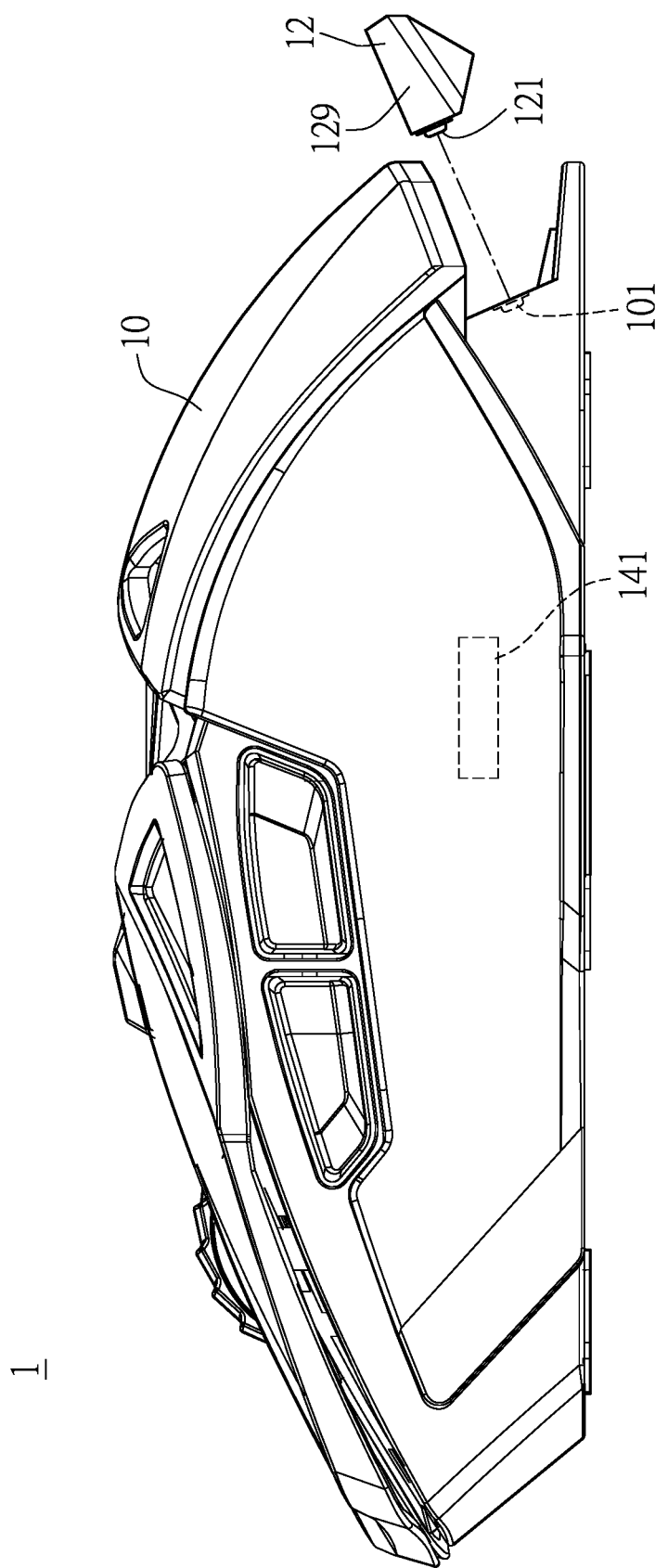
FIG. 1B is a schematic exploded view of the mouse device according to the first embodiment of the present disclosure.

Referring to FIG. 1A and FIG. 1B, FIG. 1A is a schematic assembled view of the mouse device according to a first embodiment of the present disclosure, and FIG. 1B is a schematic exploded side view of the mouse device according to the first embodiment of the present disclosure. A mouse device 1 in the present embodiment exemplarily includes, but is not limited to, a casing 10 and a battery module 12. The battery module 12 is connected to the casing 10 in a pluggable manner, so that the battery module 12 is connected to an outside of the casing 10 of the mouse device 1. In one embodiment, the battery module 12 can also be a part of the casing of the mouse device, and a shape of the battery module 12 is not limited and can be flexibly designed according to a usage requirement.

Further, the battery module 12 includes a first connection interface 121, and the casing 10 includes a second connection interface 101 and a control circuit 141. The battery module 12 is detachably mated with the second connection interface 101 of the casing 10 through the first connection interface 121. As shown in FIG. 1B, the battery module 12 can be pulled out from an appropriate position of the casing 10 of the mouse device 1, that is, the first connection interface 121 is not connected to the second connection interface 101 at this time.

As shown in FIG. 1A, the battery module 12 can also be inserted into the appropriate position of the casing 10 of the mouse device 1, so that the first connection interface 121 is connected to the second connection interface 101. Accordingly, the control circuit 141 disposed inside the casing 10 can successfully obtain power from the battery module 12 through the second connection interface 101 that is connected to the first connection interface 121.

In other words, the second connection interface 101 of the mouse device 1 is arranged on the outside of the casing 10, so that the battery module 12 is connected to the outside of the casing 10 when the battery module 12 is connected to the second connection interface 101 through the first connection interface 121.

It should be noted that the battery module 12 is exposed outside of the casing 10 when the battery module 12 is mated with second connection interface 101 of the casing 10, that is, the battery module 12 is disposed on a side outside of the casing 10, which allows the user to directly and easily replace the battery module 12.

In one embodiment, the battery module 12 has a holding part 129, which is arranged on a side adjacent to the first connection interface 121. When the first connection interface 121 of the battery module 12 is mated with the second connection interface 101, the holding part 129 of the battery module 12 is exposed outside of the casing 10, which allows the user to easily replace the battery module 12 through the holding part 129.

In one embodiment, the first connection interface 121 and the second connection interface 101 not only allows the battery module 12 and casing 10 to be structurally connected to each other, but also the first connection interface 121 and the second connection interface 101 can each provide an electrical connection terminal, so that the control circuit 141 of the casing 10 can transmit an electrical signal (such as a power signal, a control signal or a data signal, but not limited thereto) to the battery module 12 through the electrical connection terminal.

In addition, the first connection interface 121 and the second connection interface 101 each can include a power transmission interface for a transmission of the power signal, and the first connection interface 121 and the second connection interface 101 each can include a serial peripheral interface or an inter-integrated circuit interface for a transmission of the control signal or the data signal. Furthermore, a structural design for a connection between the first connection interface 121 and the second connection interface 101 can be, for example, a magnetically attracting connection, a fastener, or any combination of structural designs that allow the user to easily replace the battery module.

The control circuit 141 of the casing 10 is electrically connected to the second connection interface 101. When the control circuit 141 obtains the power from the battery module 12, the control circuit 141 can perform a relevant operation of the mouse device 1, such as a mouse button control and a mouse cursor control, but it is not limited thereto. The control circuit 141 can also perform other operations according to practical requirements, such as a mouse parameters setting and a macro command control.

In one embodiment, when the battery module 12 is connected to the second connection interface 101 of the casing 10, the control circuit 141 can not only obtain the power from the battery module 12, but can also control the battery module 12 to display a power level or control the battery module 12 to display information of an operating status of the mouse device 1, such as a setting parameter of dots per linear inch (DPI) of the mouse device 1 or a content of the macro command, but it is not limited thereto. The control circuit 141 can also wirelessly transmit the control signal to an outside through the battery module 12. The control signal can be a mouse button data or a mouse cursor movement data, but is not limited thereto.

Second Embodiment

Figure 2:
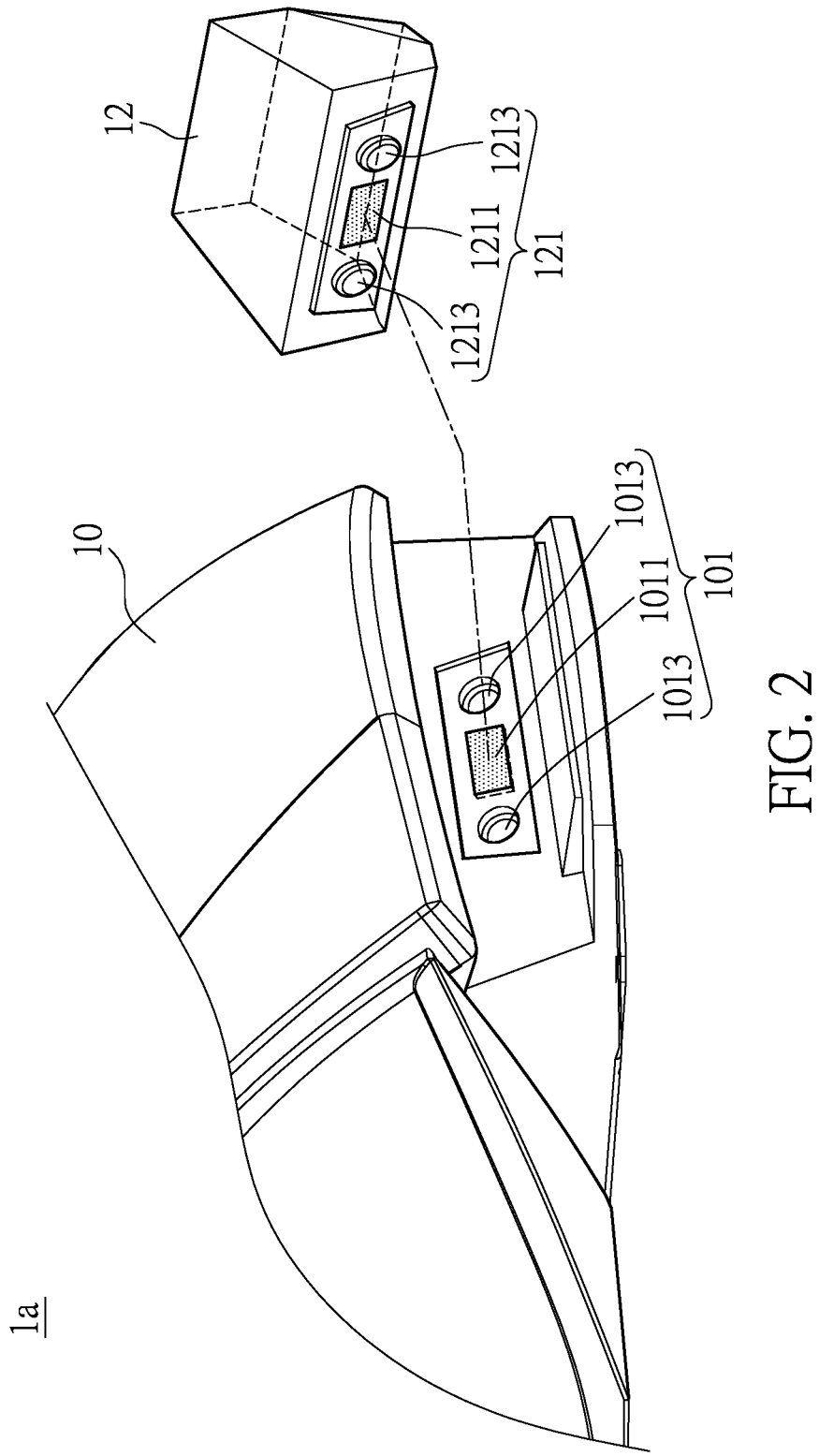
FIG. 2 is a schematic view illustrating a connection of a battery module to the casing according to a second embodiment of the present disclosure.

Referring to FIG. 2, FIG. 2 is a schematic view illustrating a connection of a battery module to the casing according to a second embodiment of the present disclosure. As shown in FIG. 2, the battery module 12 of a mouse device 1a is connected to the casing 10 by magnetic attraction. Further, the first connection interface 121 includes a first electrically conducting interface 1213 and a first magnetically attracting part 1211, and the second connection interface 101 includes a second electrically conducting interface 1013 and a second magnetically attracting part 1011. When the first connection interface 121 is close to the second connection interface 101, the first magnetically attracting part 1211 is magnetically attracted to the second magnetically attracting part 1011, so that the first electrically conducting interface 1213 is connected to the second electrically conducting interface 1013. Accordingly, the electrical signal between the casing 10 and the battery module 12 can be transmitted through the first electrically conducting interface 1213 and the second electrically conducting interface 1013.

The first electrically conducting interface 1213 and the second electrically conducting interface 1013 each can have a plurality of electrically conducting terminals, and a quantity as well as an appearance of the plurality of electrically conducting terminals are not limited to a configuration pattern shown in FIG. 2. The electrically conducting terminals can be used to transmit various electrical signals such as the power signal, the control signal or the data signal.

It should be noted that the first connection interface 121 and the second connection interface 101 each has a non-parallelogram appearance. For example, the first connection interface 121 and the second connection interface 101 each has a trapezoid appearance as shown in FIG. 2, so that a foolproof connection design is provided to prevent the first connection interface 121 from being connected to the second connection interface 101 in a wrong direction, which affects a normal operation of the mouse device 1a.

Third Embodiment

Figure 3:
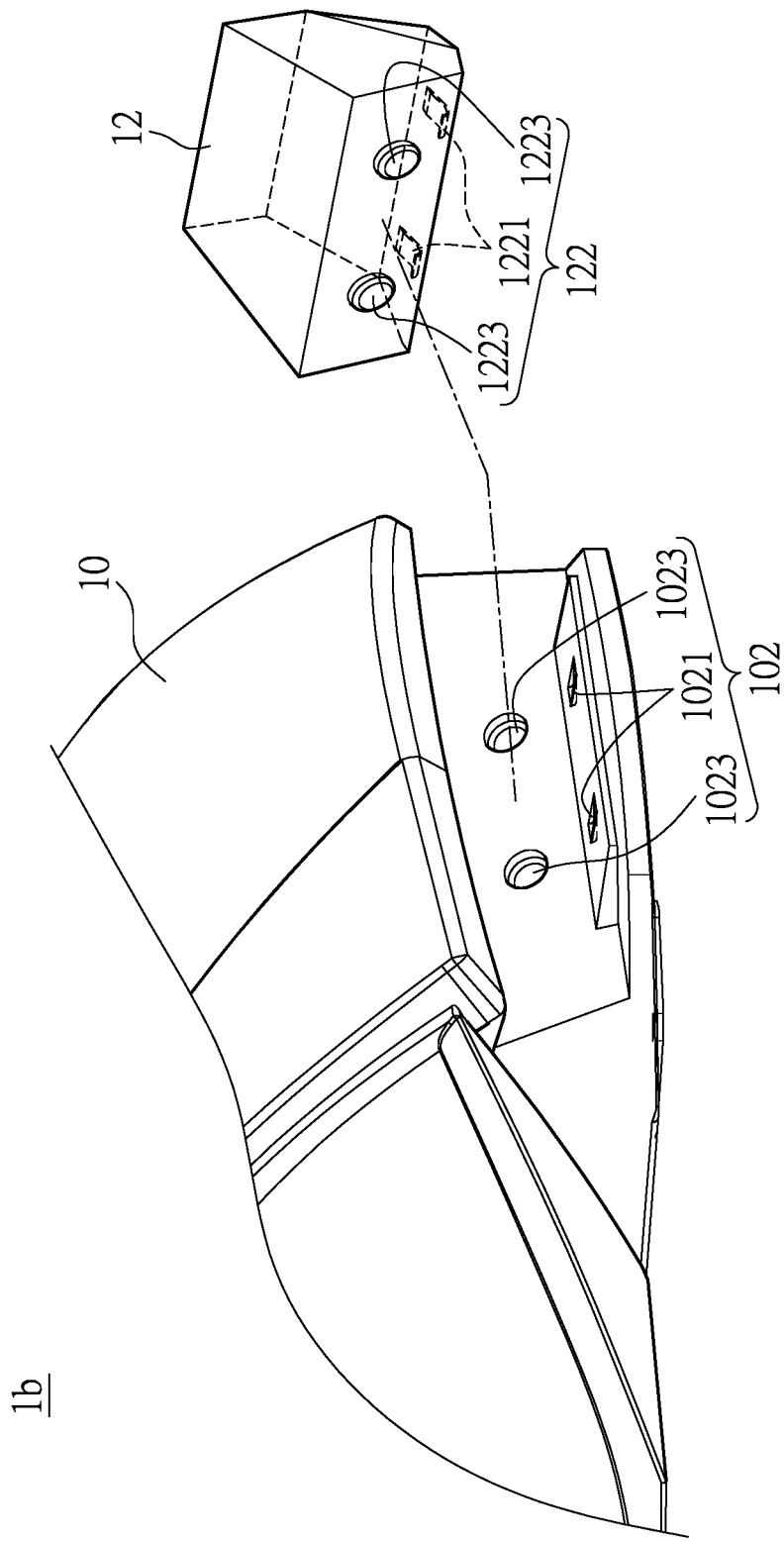
FIG. 3 is a schematic view illustrating a connection of a battery module to the casing according to a third embodiment of the present disclosure.

Referring to FIG. 3, FIG. 3 is a schematic view illustrating a connection of a battery module to the casing according to a third embodiment of the present disclosure. As shown in FIG. 3, the battery module 12 of a mouse device 1b is connected to the casing 10 through a fastener. Further, a first connection interface 122 includes a first electrically conducting interface 1223 and a first fastener part 1221, and a second connection interface 102 includes a second electrically conducting interface 1023 and a second fastener part 1021. When the first connection interface 122 is close to the second connection interface 102, the first fastener part 1221 is connected to the second fastener part 1021, so that the first electrically conducting interface 1223 is connected to the second electrically conducting interface 1023. Accordingly, the electrical signal between the casing 10 and the battery module 12 can be transmitted through the first electrically conducting interface 1223 and the second electrically conducting interface 1023. In addition, the fastener of the first fastener part 1221 and the second fastener part 1021 is not limited to a configuration pattern shown in FIG. 3, but can also include other designs of the fastener.

Fourth Embodiment

Figure 4:
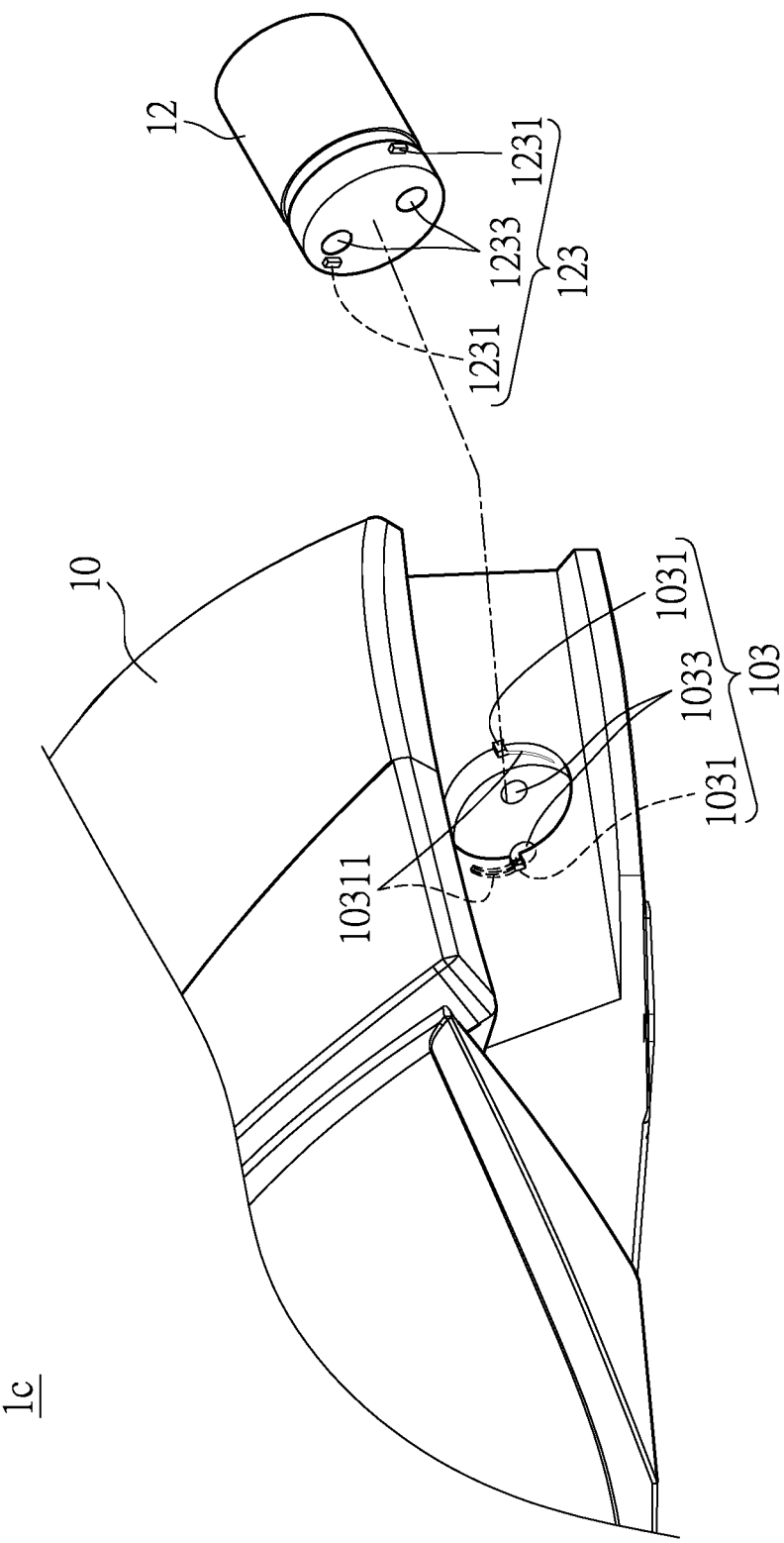
FIG. 4 is a schematic view illustrating a connection of a battery module to the casing according to a fourth embodiment of the present disclosure.

Referring to FIG. 4, FIG. 4 is a schematic view illustrating a connection of a battery module to the casing according to a fourth embodiment of the present disclosure. As shown in FIG. 4, the battery module 12 of a mouse device 1c is connected to the casing 10 in a rotating manner. Further, a first connection interface 123 includes a first electrically conducting interface 1233 and a first fastener part 1231, and a second connection interface 103 has a second electrically conducting interface 1033 and a second fastener part 1031. When the first connection interface 123 is close to the second connection interface 103, the first fastener part 1231 is fastened to the second fastener part 1031. In addition, the second fastener part 1031 has a groove 10311 that has an assembly chamfer, and the first fastener part 1231 can be rotated to an end of the groove 10311 along the assembly chamfer, so that the first electrically conducting interface 1233 is connected to the second electrically conducting interface 1033. Accordingly, the electrical signal between the casing 10 and the battery module 12 can be transmitted through the first electrically conducting interface 1233 and the second electrically conducting interface 1033.

Fifth Embodiment

Figure 5:
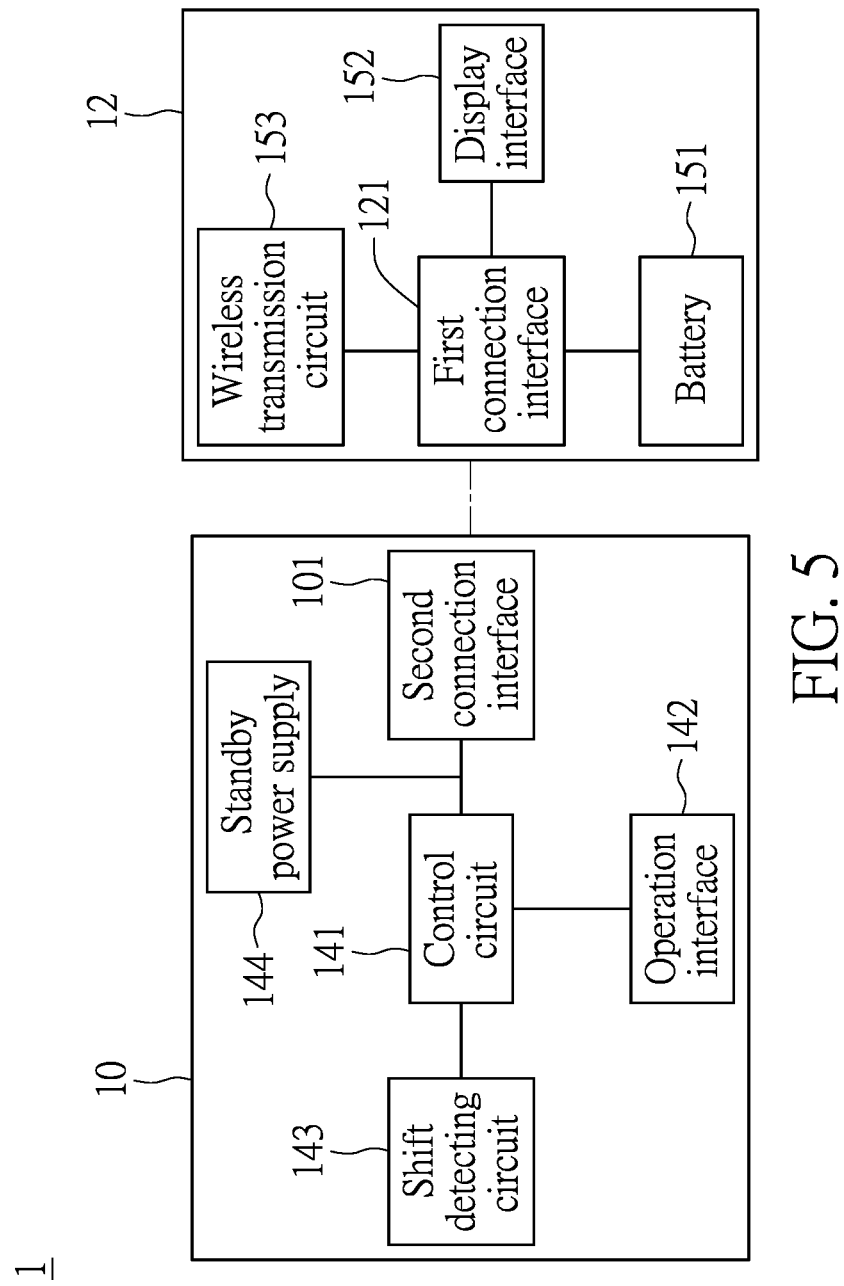
FIG. 5 is a functional block diagram of the mouse device according to a fifth embodiment of the present disclosure.

Referring to FIG. 5, FIG. 5 is a functional block diagram of a mouse device according to a fifth embodiment of the present disclosure. As shown in FIG. 5, the casing 10 of the mouse device 1 exemplarily includes, but is not limited to, a control circuit 141, a second connection interface 101, an operation interface 142, a shift detecting circuit 143, and a standby power supply 144. The control circuit 141, the second connection interface 101, the operation interface 142, the shift detecting circuit 143, and the standby power supply 144 can be integrated on one or more circuit boards. The battery module 12 exemplarily includes, but is not limited to, a first connection interface 121, a battery 151, a display interface 152, and a wireless transmission circuit 153. The control circuit 141 is electrically connected to each of the second connection interface 101, the operation interface 142, the shift detecting circuit 143, and the standby power supply 144. The first connection interface 121 is electrically connected to each of the battery 151, the display interface 152, and the wireless transmission circuit 153.

The shift detecting circuit 143 is mainly used to detect a shift of the mouse device 1, and the control circuit 141 generates a cursor control signal according to a detecting result of the detecting circuit 143. A specific implementation of the shift detecting circuit 143 is known to those skilled in the art, and will not be reiterated herein.

The user can operate the mouse device 1 through the operation interface 142. The operation interface 142 can exemplarily be a button, a scroll wheel or a touchpad, but is not limited thereto. The control circuit 141 generates the control signal according to an operation on the operation interface 142.

The standby power supply 144 can be used to temporarily supply the power to the mouse device 1 during a replacement of the battery module 12. For example, when the first connection interface 121 of the battery module 12 is connected to the second connection interface 101 of the casing 10, an electronic component inside the casing 10 can obtain the power from the battery 151 of the battery module 12, and the power from the battery 151 of the battery module 12 also charges the standby power supply 144. When the battery module 12 is separated from the casing 10 during the replacement of the battery module 12, the standby power supply 144 continues to provide the power to the electronic component inside the casing 10. In one embodiment, the standby power supply is exemplarily a capacitor, but is not limited thereto.

The battery 151 of the battery module 12 can provide the power to each of the display interface 152, the wireless transmission circuit 153, and the electronic component inside the casing 10. When the first connection interface 121 of the battery module 12 is mated with the second connection interface 101 of the casing 10, the battery 151 of the battery module 12 provides the power to the electronic component inside the casing 10, and the battery 151 of the battery module 12 provides the power to the display interface 152 and the wireless transmission circuit 153.

The display interface 152 can be used to display the power level or a charging status of the battery 151, but it is not limited thereto. For example, in one embodiment, the control circuit 141 transmits an operating status of the mouse device 1 to the display interface 152 through the second connection interface being connected to the first connection interface 121. The operating status of the mouse device 1 can exemplarily be setting information of the macro command, the DPI of the mouse or a polling rate of the mouse, but is not limited thereto. The display interface 152 can be implemented, for example, through one or more light emitting elements (e.g., a light emitting diode) or flat panel displays.

In one embodiment, the control circuit 141 transmits the control signal of the mouse device 1 to the wireless transmission circuit 153 through the second connection interface 101 being connected to the first connection interface 121, so that the wireless transmission circuit 153 can wirelessly transmit the control signal to a computer device that is wirelessly connected to the mouse device 1. The control signal of the mouse device 1 can exemplarily be a mouse cursor command, a mouse button command or the macro command provided by the control circuit 141, but is not limited thereto.

Further, the power of the control circuit 141 is provided by the battery module 12, and the control circuit 141 can only successfully obtain the power from the battery module 12 when the first connection interface 121 of the battery module 12 is connected to the second connection interface 101 of the casing 10. In other words, the battery module 12 of the mouse device 1 can be used as a power switch. For example, when the battery module 12 is connected to the outside of the casing 10, that is, when the first connection interface 121 is connected to the second connection interface 101, the control circuit 141 of the mouse device 1 is powered on and the mouse device 1 can operate normally. On the other hand, when the battery module 12 is not connected to the outside of the casing 10, that is, when the first connection interface 121 is not connected to the second connection interface 101, the control circuit 141 of the mouse device 1 cannot be activated because the power is not available, and accordingly the mouse device 1 cannot operate normally.

In one embodiment, the control circuit 141 can exemplarily be one of an application-specific integrated circuit, a field programmable gate array, and a system on a chip, or any combination thereof, and the control circuit 141 can work with other related circuit components and a firmware to achieve the above-mentioned operation.

In one embodiment, the wireless transmission circuit 153 of the battery module 12 can also be disposed inside the casing 10 and be electrically connected to the control circuit 141.

Sixth Embodiment

Figure 6A:
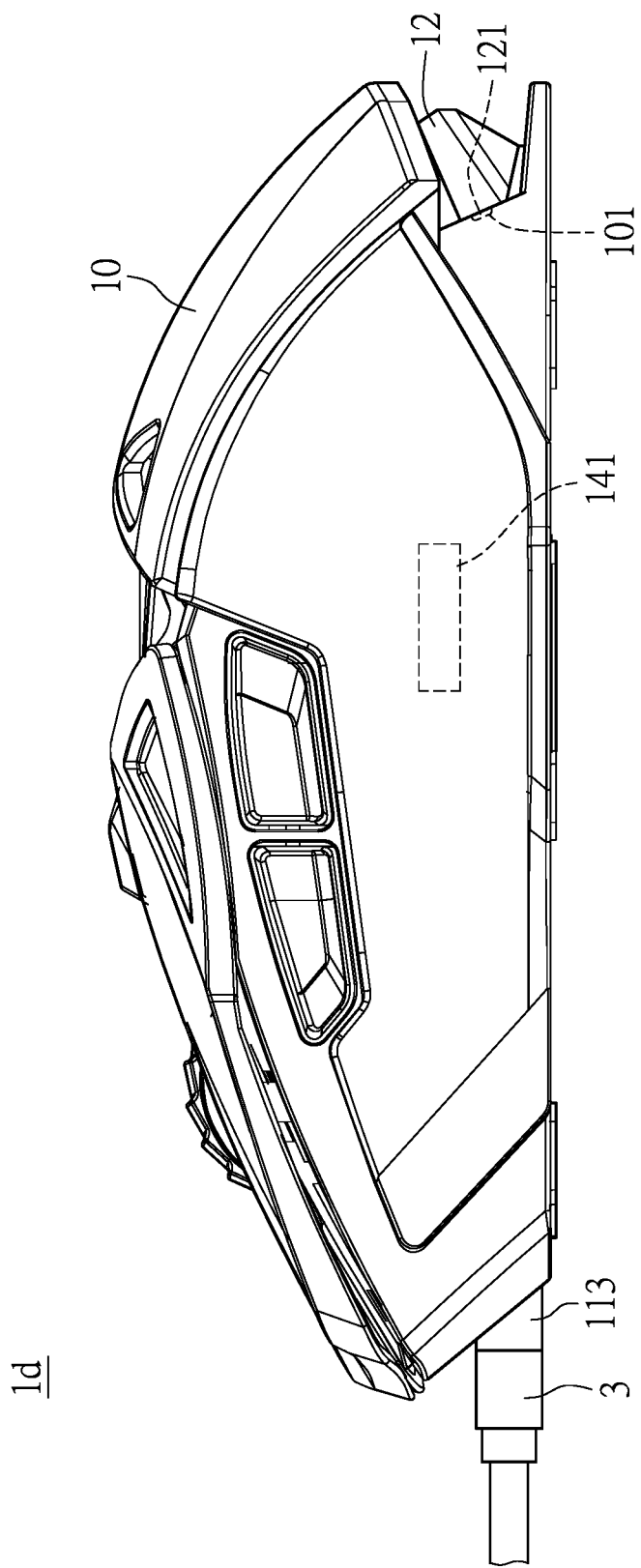
FIG. 6A is a schematic assembled view of a mouse device according to a sixth embodiment of the present disclosure.
Figure 6B:
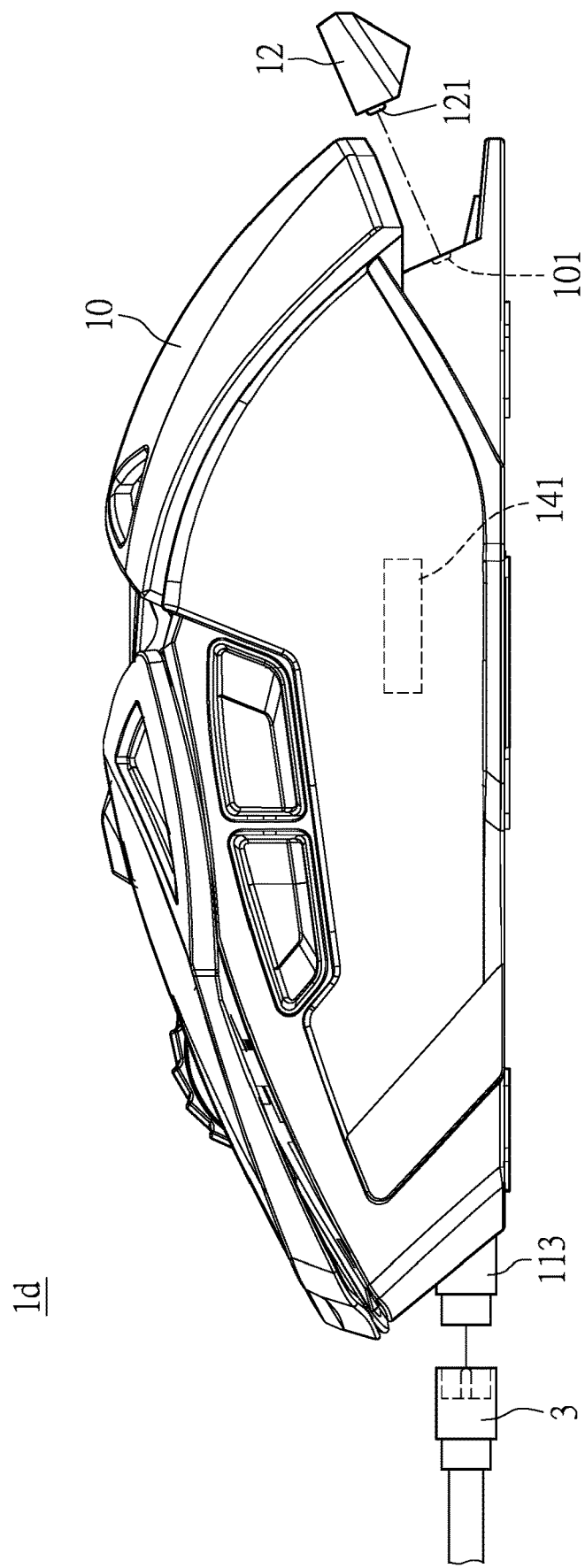
FIG. 6B is a schematic exploded view of the mouse device according to the sixth embodiment of the present disclosure.

Referring to FIG. 6A and FIG. 6B, FIG. 6A is a schematic assembled view of a mouse device according to a sixth embodiment of the present disclosure, and FIG. 6B is a schematic exploded side view of the mouse device according to the sixth embodiment of the present disclosure. A mouse device 1d in the present embodiment exemplarily includes, but is not limited to, the casing 10 and the battery module 12. The battery module 12 is connected to the casing 10 in the pluggable manner, so that the battery module 12 can be connected to the outside of the mouse device 1d. In addition, another end of the casing 10 is available for a transmission line 3 to be connected to the casing 10 in the pluggable manner. Furthermore, the battery module 12 includes the first connection interface 121, and the casing 10 includes the second connection interface 101, a third connection interface 113, and the control circuit 141. The connection and the operation of the battery module 12 and the casing 10 have been described in the preceding embodiments, and will be not reiterated herein.

One end of the transmission line 3 is used for connecting to the third connection interface 113, and another end of the transmission line 3 is used for connecting to the computer device. Accordingly, the mouse device 1d can be connected to the computer device in a wired manner through the transmission line 3, which allows the mouse device 1d to be used as a wired mouse. It should be noted that the mouse device 1d in the present embodiment can have relatively different operating modes for use according to different usage conditions of the transmission line 3 and the battery module 12.

In one embodiment, when the second connection interface 101 of the casing 10 is connected to the first connection interface 121 of the battery module 12, and the third connection interface 113 of the casing 10 is not connected to the transmission line 3, the operating mode of the mouse device 1d at this time is in a wireless mode. That is, the mouse device 1d can be used as a wireless mouse, and the control circuit 141 wirelessly transmits the control signal generated according to the operation of the mouse device 1d to the computer device through the wireless transmission circuit 153 of the battery module 12.

In one embodiment, when the second connection interface 101 of the casing 10 is not connected to the first connection interface 121 of the battery module 12, and the third connection interface 113 of the casing 10 is connected to the transmission line 3, the operating mode of the mouse device 1d at this time is in a wired mode. That is, the mouse device 1d can be used as a wired mouse, and the control circuit 141 transmits the control signal generated according to the operation of the mouse device 1d to the computer device through the transmission line 3.

In one embodiment, when the second connection interface 101 of the casing 10 is connected to the first connection interface 121 of the battery module 12, and the third connection interface 113 of the casing 10 is connected to the transmission line 3, the operating mode of the mouse device 1d at this time is in a working charging mode, which refers to being in the wired mode and a charging mode. That is, the mouse device 1d can be used as a wired mouse, and can also charge the battery module 12 by obtaining an external power from the computer device through the transmission line 3.

Seventh Embodiment

Figure 7:
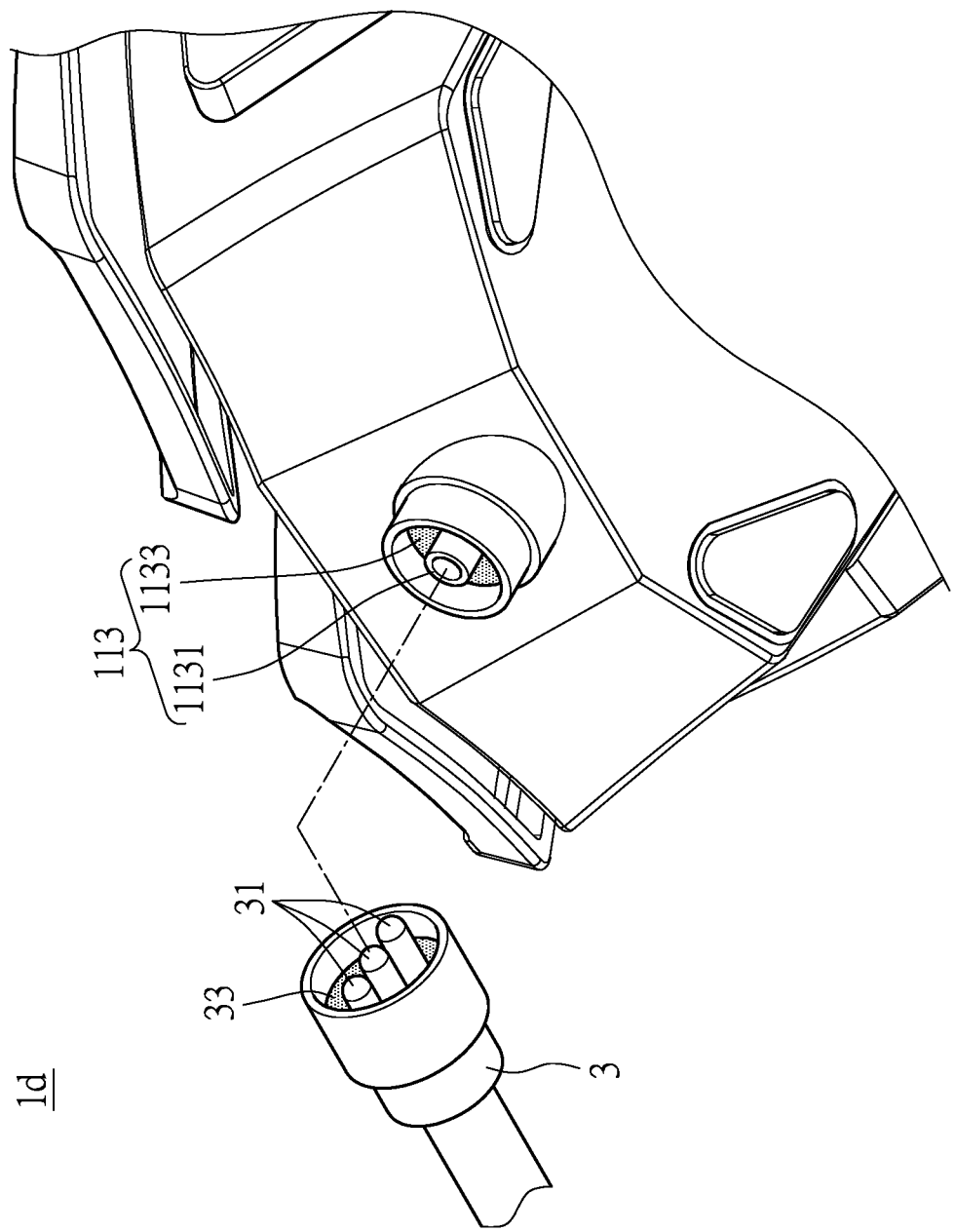
FIG. 7 is a schematic view illustrating a connection of a transmission line to the casing according to a seventh embodiment of the present disclosure.

Referring to FIG. 7, FIG. 7 is a schematic view illustrating a connection of a transmission line to the casing according to a seventh embodiment of the present disclosure. As shown in FIG. 7, the transmission line 3 of the mouse device 1*d* is connected to the casing 10 in the magnetically attracting manner. Further, the third connection interface 113 includes a third electrically conducting interface 1131 and a third magnetically attracting part 1133, and the transmission line 3 includes a fourth electrically conducting interface 31 and a fourth magnetically attracting part 33. When the transmission line 3 is close to the third connection interface 113, the third magnetically attracting part 1133 is magnetically attracted to the fourth magnetically attracting part 33, so that the third electrically conducting interface 1131 is connected to the fourth electrically conducting interface 31. Accordingly, the electrical signal between the casing 10 and the transmission line 3 can be transmitted through the third electrically conducting interface 1131 and the fourth electrically conducting interface 31.

The third electrically conducting interface 1131 and the fourth electrically conducting interface 31 can each have a plurality of electrically conducting terminals, and a quantity as well as an appearance of the plurality of electrically conducting terminals are not limited to a configuration pattern shown in FIG. 7. The electrically conducting terminal can be used to transmit various electrical signals such as the power signal, the control signal or the data signal. The third connection interface 113 has the appearance of a circular interface, but it is not limited thereto.

Eighth Embodiment

Figure 8:
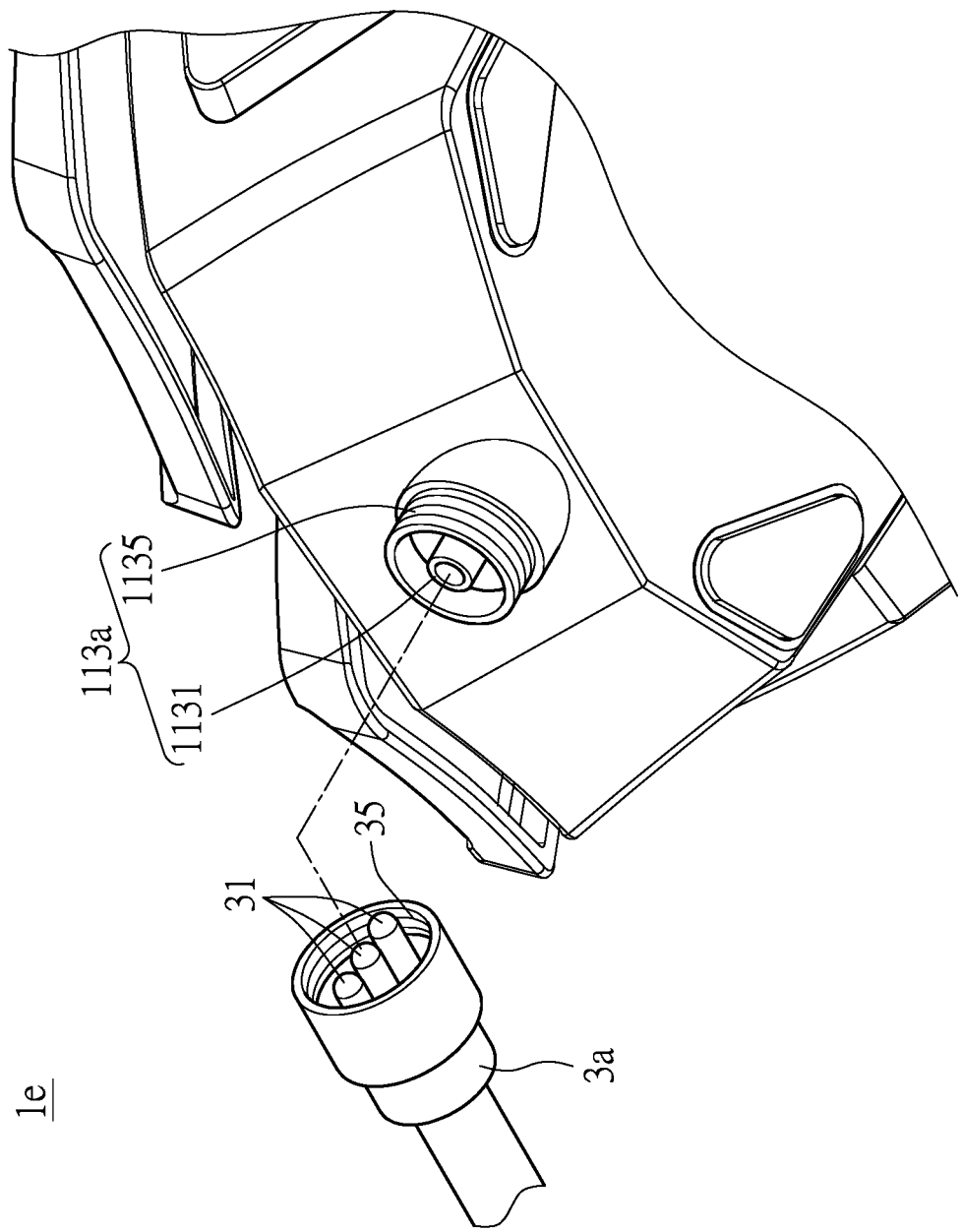
FIG. 8 is a schematic view illustrating a connection of a transmission line to the casing according to an eighth embodiment of the present disclosure.

Referring to FIG. 8, FIG. 8 is a schematic view illustrating a connection of a transmission line to the casing according to an eighth embodiment of the present disclosure. As shown in FIG. 8, a transmission line 3*a* of a mouse device 1*e* is threadedly engaged with the casing 10. Further, a third connection interface 113*a* includes the third electrically conducting interface 1131 and a first thread part 1135, and the transmission line 3 includes the fourth electrically conducting interface 31 and a second thread part 35. When the transmission line 3*a* is close to the third connection interface 113*a*, the first thread part 1135 is threadedly engaged with the second thread part 35, so that the third electrically conducting interface 1131 is connected to the fourth electrically conducting interface 31. Accordingly, the electrical signal between the casing 10 and the transmission line 3*a* can be transmitted through the third electrically conducting interface 1131 and the fourth electrically conducting interface 31. The first thread part 1035 is an external thread, and the second thread part 35 is an internal thread, but they are not limited thereto.

Ninth Embodiment

Figure 9:
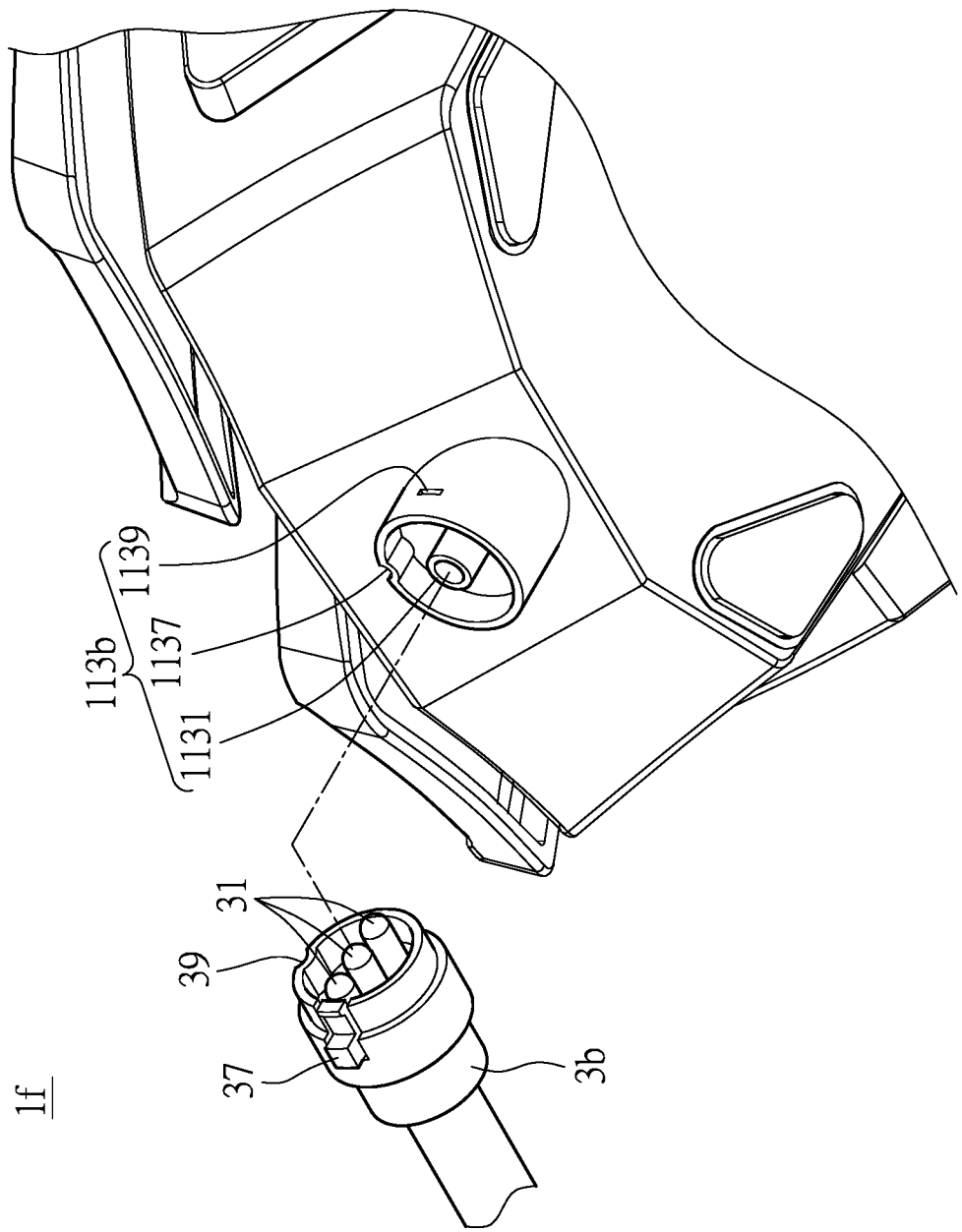
FIG. 9 is a schematic view illustrating a connection of a battery module to the casing according to a ninth embodiment of the present disclosure.

Referring to FIG. 9, FIG. 9 is a schematic view illustrating a connection of a battery module to the casing according to a ninth embodiment of the present disclosure. As shown in FIG. 9, a transmission line 3*b* of a mouse device 1*f* is connected to the casing 10 through a fastener. Further, a third connection interface 113*b* includes the third electrically conducting interface 1131, a third fastener part 1139, and a third recess 1137, and the transmission line 3*b* includes the fourth electrically conducting interface 31, a fourth fastener part 37, and a fourth recess 39. When the transmission line 3*b* is close to the third connection interface 113*b*, through a fitting connection between the third recess 1137 and the fourth recess 39, the third fastener part 1139 can be successfully fastened to the fourth fastener part 37, so that the third electrically conducting interface 1131 is connected to the fourth electrically conducting interface 31. Accordingly, the electrical signal between the casing 10 and the transmission line 3*b* can be transmitted through the third electrically conducting interface 1131 and the fourth electrically conducting interface 31. In addition, the fastener of the third fastener part 1139 and the fourth fastener part 37 is not limited to a configuration pattern shown in FIG. 9, but can also include other designs of the fastener.

Tenth Embodiment

Figure 10:
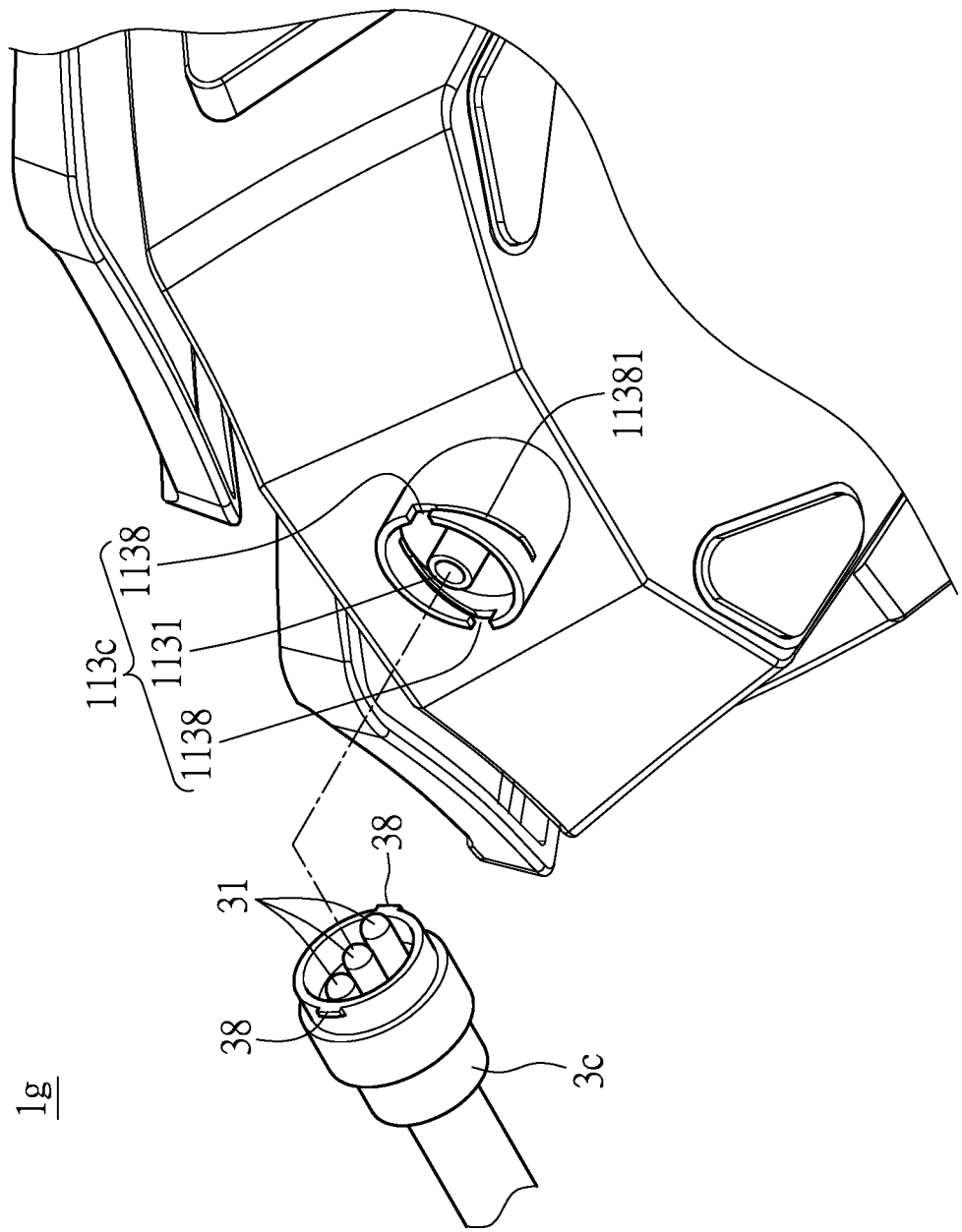
FIG. 10 is a schematic view illustrating a connection of a battery module to the casing according to a tenth embodiment of the present disclosure.

Referring to FIG. 10, FIG. 10 is a schematic view illustrating a connection of a battery module to the casing according to a tenth embodiment of the present disclosure. As shown in FIG. 10, a transmission line 3*c* of a mouse device 1*g* is connected to the casing 10 in a rotating manner. Further, a third connection interface 113*c* includes the third electrically conducting interface 1131 and a third fastener part 1138, and the transmission line 3*c* includes the fourth electrically conducting interface 31 and a fourth fastener part 38. When the transmission line 3*c* is close to the third connection interface 113*c*, the third fastener part 1138 is fastened to the fourth fastener part 38. In addition, the third fastener part 1138 has a groove 11381 that has an assembly chamfer, and the fourth fastener part 38 can be rotated to an end of the groove 11381 along the assembly chamfer, so that the third electrically conducting interface 1131 is connected to the fourth electrically conducting interface 31. Accordingly, the electrical signal between the casing 10 and the transmission line 3*c* can be transmitted through the third electrically conducting interface 1131 and the fourth electrically conducting interface 31.

Eleventh Embodiment

Figure 11:
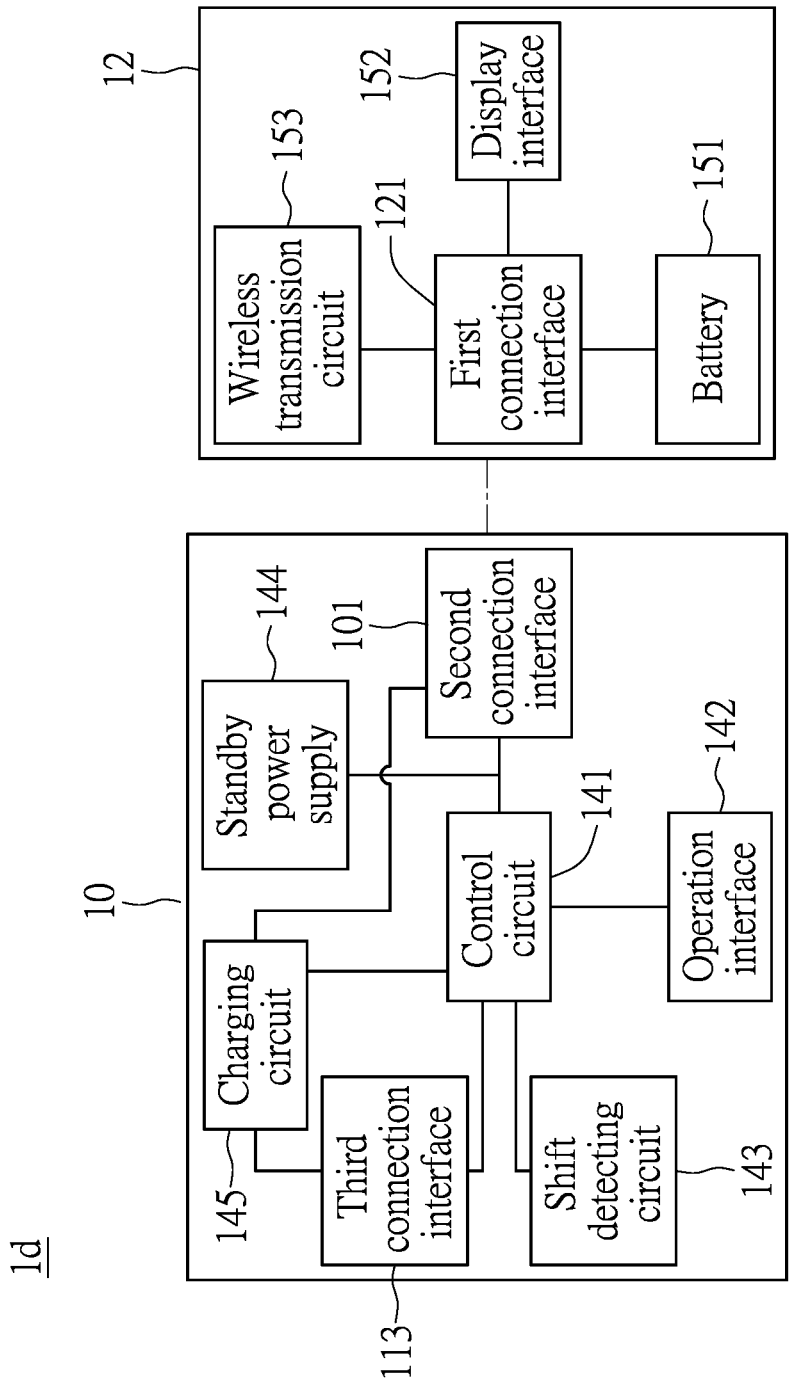
FIG. 11 is a functional block diagram of the mouse device according to an eleventh embodiment of the present disclosure.

Referring to FIG. 11, FIG. 11 is a functional block diagram of a mouse device according to an eleventh embodiment of the present disclosure. Compared to the mouse device 1 shown in FIG. 5, the mouse device 1*d* shown in FIG. 11 further includes the third connection interface 113 and a charging circuit 145. Descriptions with respect to the new components are provided herein, while descriptions for similar components can be referred to previous embodiments.

The third connection interface 113 is electrically connected to the control circuit 141. The third connection interface 113 can be used for connecting to the transmission line 3, so as to obtain the external power from the computer device, and at the same time, the control signal generated by the operation of the mouse device 1*d* can be transmitted to the computer device through the third connection interface 113.

The charging circuit 145 is electrically connected to each of the second connection interface 101, the third connection interface 113, and the control circuit 141. The charging circuit 145 can obtain the external power from the computer device through the third connection interface 113 and use the external power as the charging power to charge the battery module 12 that is connected to the second connection interface 101.

In one embodiment, the control circuit 141 of the mouse device 1d controls the operating mode of the mouse device 1d according to a connection status of the second connection interface 101 and the third connection interface 113. Specifically speaking, it can be known that the second connection interface 101 is connected to the battery module 12 when the control circuit 141 obtains the power through the second connection interface 101, and it can be known that the third connection interface 113 is connected to the transmission line 3 when the control circuit 141 obtains the power through the third connection interface 113.

When the control circuit 141 determines that the second connection interface 101 is connected to the battery module 12 and the third connection interface 113 is not connected to the transmission line 3, the control circuit 141 controls the operation of the mouse device 1d to be in the wireless mode. In the wireless mode, the control circuit 141 obtains the power from the battery module 12, and the control signal generated by the control circuit 141 according to the operation of the mouse device 1d is wirelessly transmitted to the computer device through the wireless transmission circuit 153 of the battery module 12. In addition, in the wireless mode, the display interface 152 of the battery module 12 can be used to display the power level of the battery 151, and can also be used to display the operating status of the mouse device 1d.

When the control circuit 141 determines that the second connection interface 101 is not connected to the battery module 12 and the third connection interface 113 is connected to the transmission line 3, the control circuit 141 controls the operation of the mouse device 1d to be in the wired mode. In the wired mode, the control circuit 141 obtains the external power from the computer device through the transmission line 3 for use as the working power of the mouse device 1d, and the control signal generated by the control circuit 141 according to the operation of the mouse device 1d is transmitted to the computer device through the transmission line 3.

When the control circuit 141 determines that the second connection interface 101 is connected to the battery module 12 and the third connection interface 113 is connected to the transmission line 3, the control circuit 141 controls the operation of the mouse device 1d to be in the working charging mode. In the working charging mode, the control circuit 141 obtains the external power from the computer device through the transmission line 3 for use as the working power of the mouse device 1d, and the control signal generated by the control circuit 141 according to the operation of the mouse device 1d is transmitted to the computer device through the transmission line 3. At the same time, the control circuit 141 also controls the charging circuit 145 to use the external power from the computer device as the charging power. That is, the charging circuit 145 uses the charging power for charging the battery module 12 that is connected to the second connection interface 101. In addition, during the charging process of the battery module 12, the charging status of the battery 151 can be displayed on the display interface 152.

It should be noted that when the operation of the mouse device 1d is in the working charging mode, the operation of the mouse device 1d is switched from the working charging mode to the wired mode if the battery module 12 that is connected the second connection interface 101 is removed. When the operation of the mouse device 1d is in the working charging mode, the operation of the mouse device 1d is switched from the working charging mode to the wireless mode if the transmission line 3 that is connected the third connection interface 113 is removed. Accordingly, the operating mode of the mouse device 1d can be quickly switched by simply plugging and unplugging the battery module 12 or the transmission line 3, so as to provide an uncomplicated and user-friendly operation.

In one embodiment, in addition to the charging circuit 145 being disposed inside the casing 10, the charging circuit 145 can also be disposed in the battery module 12 for charging the battery 151. When the charging circuit 145 is disposed in the battery module 12, the charging circuit 145 is electrically connected to the first connection interface 121 and the battery 151, and the charging circuit 145 can obtain the external power from the computer device that is connected to the third connection interface 113 through the first connection interface 121 and the second connection interface 101, so as to use the external power as the charging power.

Beneficial Effects of the Embodiments

In conclusion, by virtue of the battery module being connected to the outside of the casing, the battery can be conveniently and quickly replaced, and an inside of the casing can be simplified. In addition, the battery module that is pluggable can be used as the power switch of the mouse device, so as to provide a user-friendly operation. Furthermore, the display interface is integrated in the battery module, so that the operating status of the mouse device can be quickly displayed when the battery module is connected to the outside of the casing, and a space-saving effect can be achieved since a display function is unnecessary to be provided on the inside of the casing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse device, comprising:
a battery module including a first connection interface and a display interface;
a casing including a second connection interface and a third connection interface; and
a control circuit disposed inside the casing and electrically connected to the second connection interface and the third connection interface;
wherein the battery module is detachably mated with the second connection interface through the first connection interface, and the battery module is exposed outside of the casing when being mated with the second connection interface;
wherein the third connection interface is used for connecting a transmission line;
wherein the control circuit controls an operation of the mouse device to be in a wired mode or a wireless mode according to a connection status of the second connection interface and the third connection interface;
wherein the third connection interface includes a third electrically conducting interface and a first thread part, and the transmission line includes a fourth electrically conducting interface and a second thread part;
wherein, when the transmission line is engaged with the third connection interface, the first thread part is threadedly engaged with the second thread part, so that the third electrically conducting interface is connected to the fourth electrically conducting interface;
wherein, when the first connection interface of the battery module is mated with the second connection interface of the casing, the control circuit transmits an operating status of the mouse device to the display interface through the second connection interface being connected to the first connection interface, the operating status includes setting information of a macro command, a dots per inch of the mouse device or a polling rate of the mouse device.

2. The mouse device according to claim 1, wherein the first connection interface includes a first magnetically attracting part, the second connection interface includes a second magnetically attracting part, and wherein, when the first connection interface is connected to the second interface, the first magnetically attracting part is magnetically attracted to the second magnetically attracting part.

3. The mouse device according to claim 1, wherein the first connection interface is a first fastener part and the second connection interface is a second fastener part, and the first fastener part and the second fastener part are fastened to each other.

4. The mouse device according to claim 3, wherein the second fastener part has a groove, the groove has an assembly chamfer to guide the first fastener part to rotate along the assembly chamfer, so that the first connection interface is connected to the second connection interface.

5. The mouse device according to claim 1, wherein the display interface displays a power level of the battery module.

6. The mouse device according to claim 5, wherein the battery module further includes a wireless transmission circuit, the control circuit wirelessly transmits a control signal to a computer device through the wireless transmission circuit when the battery module is mated with the second connection interface.

7. The mouse device according to claim 1, wherein the display interface is at least one of a light emitting element and a flat panel display.

8. The mouse device according to claim 1, further comprising a standby power supply, the standby power supply being electrically connected to the control circuit, the standby power supply obtaining power from the battery module for charging when the battery module is mated with the second connection interface, and the standby power supply providing the power to the control circuit when the battery module is not mated with the second connection interface, the standby power supply being a capacitor.

9. The mouse device according to claim 1, wherein, when the battery module is mated with the second connection interface and the third connection interface is connected to the transmission line, the control circuit controls the operation of the mouse device to be in the wired mode and a charging mode, and a control signal of the control circuit is transmitted through the transmission line to a computer device which is connected to another end of the transmission line, and wherein the control circuit obtains an external power from the computer device for use as working power through the transmission line, and the control circuit controls the external power to charge the battery module, so that a charging circuit of the mouse device obtains the external power and uses the external power as charging power to charge the battery module.

10. The mouse device according to claim 1, wherein, when the battery module is mated with the second connection interface and the third connection interface is not connected to the transmission line, the control circuit controls the operation of the mouse device to be in the wireless mode, a control signal of the control circuit is wirelessly transmitted to a computer device through a wireless transmission circuit, and the control circuit obtains power from the battery module through the second connection interface.

* * * * *